United States Patent
Yamaguchi et al.

(10) Patent No.: US 10,355,492 B2
(45) Date of Patent: Jul. 16, 2019

(54) RECHARGEABLE BATTERY CONTROLLER

(71) Applicant: OMRON Corporation, Kyoto-shi, Kyoto (JP)

(72) Inventors: Yoshihiko Yamaguchi, Kyoto (JP); Makoto Ohashi, Uji (JP); Osamu Uchida, Kusatsu (JP); Akihiro Takeshima, Otsu (JP); Takashi Kitamura, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/567,771

(22) PCT Filed: Feb. 23, 2016

(86) PCT No.: PCT/JP2016/055149
§ 371 (c)(1),
(2) Date: Oct. 19, 2017

(87) PCT Pub. No.: WO2016/194410
PCT Pub. Date: Dec. 8, 2016

(65) Prior Publication Data
US 2018/0115165 A1    Apr. 26, 2018

(30) Foreign Application Priority Data

Jun. 2, 2015  (JP) .................. 2015-112143

(51) Int. Cl.
*H02J 3/38*  (2006.01)
*G05F 1/67*  (2006.01)
(Continued)

(52) U.S. Cl.
CPC .............. *H02J 3/385* (2013.01); *G05F 1/67* (2013.01); *H02J 7/35* (2013.01); *H02M 3/00* (2013.01); *Y02E 10/566* (2013.01); *Y02E 10/58* (2013.01)

(58) Field of Classification Search
CPC ..... G05F 1/67; H02J 3/38; H02J 3/385; H02J 7/35; H02M 3/00; Y02E 10/58
(Continued)

(56) References Cited

U.S. PATENT DOCUMENTS

2011/0115295 A1*  5/2011  Moon .................. H02J 3/32
307/65
2012/0212985 A1*  8/2012  Lee ..................... G05F 1/67
363/98
(Continued)

FOREIGN PATENT DOCUMENTS

JP   H10-31525 A   2/1998
JP   2001-5543 A   1/2001
(Continued)

OTHER PUBLICATIONS

An English translation of the International Search Report of PCT/JP2016/055149 dated Apr. 26, 2016.
(Continued)

*Primary Examiner* — Thienvu V Tran
*Assistant Examiner* — Brian K Baxter
(74) *Attorney, Agent, or Firm* — Metrolexis Law Group, PLLC

(57) ABSTRACT

A rechargeable battery controller is combined with a rechargeable battery and used in an existing PV system. The controller includes a DC-DC converter, which allows power to be passed between a power line and a rechargeable battery, and a control unit, which determines whether maximum power point tracking (MPPT) control using hill climbing is being performed by a PCS based on an input voltage or current value of the PCS. The control unit regulates charge/discharge power of the rechargeable battery to allow input power of the PCS to be a target value based on the input voltage and current values of the PCS while MPPT
(Continued)

control using hill climbing is performed, and maintains, in a period during which MPPT control using hill climbing is not performed, the charge/discharge power to be the power at a beginning of the period.

6 Claims, 4 Drawing Sheets

(51) Int. Cl.
*H02M 3/00* (2006.01)
*H02J 7/35* (2006.01)

(58) Field of Classification Search
USPC .......................................................... 307/45
See application file for complete search history.

(56) References Cited

U.S. PATENT DOCUMENTS

| | | | |
|---|---|---|---|
| 2013/0181531 A1* | 7/2013 | Deboy | H02J 3/385 307/82 |
| 2013/0214608 A1* | 8/2013 | Kubota | H02J 3/32 307/82 |
| 2013/0328403 A1* | 12/2013 | Kaufman | H02J 3/385 307/77 |
| 2014/0077608 A1* | 3/2014 | Nosaka | G05F 1/67 307/77 |
| 2015/0097429 A1* | 4/2015 | Takenaka | H02J 7/35 307/22 |

FOREIGN PATENT DOCUMENTS

| | | |
|---|---|---|
| JP | 4294346 B2 | 7/2009 |
| JP | 2013-138530 A | 7/2013 |
| JP | 2014-106935 A | 6/2014 |

OTHER PUBLICATIONS

An English translation of the Written Opinion of PCT/JP2016/055149 dated Apr. 26, 2016.

* cited by examiner

RECHARGEABLE BATTERY CONTROLLER

FIELD

The present invention relates to a rechargeable battery controller.

BACKGROUND

An increasing number of photovoltaic (PV) systems, which combine a photovoltaic module and a power conditioner, are now connected to the grid (or utility grid) and to loads (or electric devices).

Power conditioners (power conditioning systems, or PCSs) for PV systems typically use maximum power point tracking (MPPT) control. A common PV system including a PCS with MPPT control can extract maximum power from its photovoltaic module. However, when the input power of the PCS varies greatly, all the power generated by the photovoltaic module may not be usable.

The PV system may incorporate a rechargeable battery that is charged and discharged to control the input power of the PCS to a value near a target value (refer to, for example, Patent Literature 1). However, the control for charging and discharging the rechargeable battery incorporated in the PV system can interfere with the MPPT control performed by the PCS. Also, the MPPT control performed by the PCS can differ depending on each individual manufacturer of the PV system, and its details are not open. A rechargeable battery controller that can control the input power of the PCS in an existing PV system to a value near a target value without affecting MPPT control remains undeveloped.

CITATION LIST

Patent Literature

Patent Literature 1: Japanese Unexamined Patent Application Publication No. 2013-138530
Patent Literature 2: Japanese Patent No. 4294346

SUMMARY

Technical Problem

One or more aspects of the present invention are directed to a rechargeable battery controller that is incorporated, together with a rechargeable battery, into an existing PV system to control input power of a power conditioner included in the PV system to a value near a target value without affecting MPPT control.

Solution to Problem

A rechargeable battery controller according to a first aspect of the present invention is connectable to a rechargeable battery and a power line connecting a photovoltaic module and a power conditioner. The power conditioner performs maximum power point tracking control. The rechargeable battery controller includes a DC-DC converter that allows power to be passed between the power line and the rechargeable battery, and a control unit that controls the DC-DC converter to regulate charge/discharge power passed between the power line and the rechargeable battery through the DC-DC converter, and determines whether maximum power point tracking control using hill climbing is being performed by the power conditioner based on an input voltage value or an input current value of the power conditioner. The control unit regulates the charge/discharge power to allow input power of the power conditioner to be a target value based on the input voltage value and the input current value of the power conditioner while maximum power point tracking control using hill climbing is being performed, and maintains, in a period during which maximum power point tracking control using hill climbing is not being performed, the charge/discharge power to be the charge/discharge power at a beginning of the period.

More specifically, maximum power point tracking (MPPT) control performed by power conditioners is typically a combination of MPPT control using hill climbing and other control (e.g., scanning of the I-V curve for the photovoltaic module) during which MPPT control using hill climbing is stopped. Although changing the charge/discharge power of the rechargeable battery under control other than MPPT control using hill climbing can shift the operating point to reduce power, changing the charge/discharge power of the rechargeable battery under MPPT control using hill climbing does not greatly affect the MPPT control. The rechargeable battery controller according to the first aspect of the present invention with the above structure can thus control the input power of the power conditioner in an existing PV system to a value near the target value without affecting MPPT control.

The control unit included in the rechargeable battery controller according to the first aspect of the present invention may regulate (change) the charge/discharge power in fixed cycles. The charge/discharge power may be regulated in cycles shorter than or equal to the cycles in which the output voltage of the photovoltaic module varies under MPPT control using hill climbing. In this case, the input power of the power conditioner can vary in a narrower range. The control unit may thus obtain a cycle in which an output voltage of the photovoltaic module varies under maximum power point tracking control using hill climbing performed by the power conditioner, and change a cycle for regulating the charge/discharge power while maximum power point tracking control using hill climbing is being performed to a cycle shorter than or equal to the obtained cycle.

A rechargeable battery controller according to a second aspect of the present invention is connectable to a rechargeable battery and a power line connecting a photovoltaic module and a power conditioner. The power conditioner performs maximum power point tracking control. The rechargeable battery controller includes a DC-DC converter that allows power to be passed between the power line and the rechargeable battery, and a control unit that controls the DC-DC converter to regulate charge/discharge power passed between the power line and the rechargeable battery through the DC-DC converter, and determines whether an I-V curve for the photovoltaic module is being scanned by the power conditioner based on an input voltage value or an input current value of the power conditioner. The control unit regulates the charge/discharge power to allow input power of the power conditioner to be a target value based on the input voltage value and the input current value of the power conditioner while the I-V curve for the photovoltaic module is not being scanned, and maintains, in a period during which the I-V curve for the photovoltaic module is being scanned, the charge/discharge power to be the charge/discharge power at a beginning of the period.

More specifically, some power conditioners may perform MPPT control by scanning the I-V curve for the photovoltaic module in a short time to shift the operating point to the maximum power point resulting from the I-V curve scanning (hereafter, MPPT control using scanning) (refer to Patent Literature 2). Other power conditioners may perform MPPT control using scanning in combination with MPPT control using another method, such as hill climbing.

Although changing the charge/discharge power of the rechargeable battery while scanning the I-V curve for the photovoltaic module can cause an operating point that is not an actual maximum power point to be determined as a maximum power point, changing the charge/discharge power of the rechargeable battery while scanning is not being performed does not greatly affect the MPPT control. Thus, the rechargeable battery controller according to the second aspect of the present invention with the above structure can also control the input power of the power conditioner in an existing PV system to a value near the target value without affecting MPPT control.

Advantageous Effects

The rechargeable battery controller according to one or more embodiments of the present invention controls the varying range of input power of the power conditioner in the existing PV system to a value near a target value without affecting MPPT control.

DETAILED DESCRIPTION

Embodiments of the present invention will now be described with reference to the drawings.

First Embodiment

Figure 1:
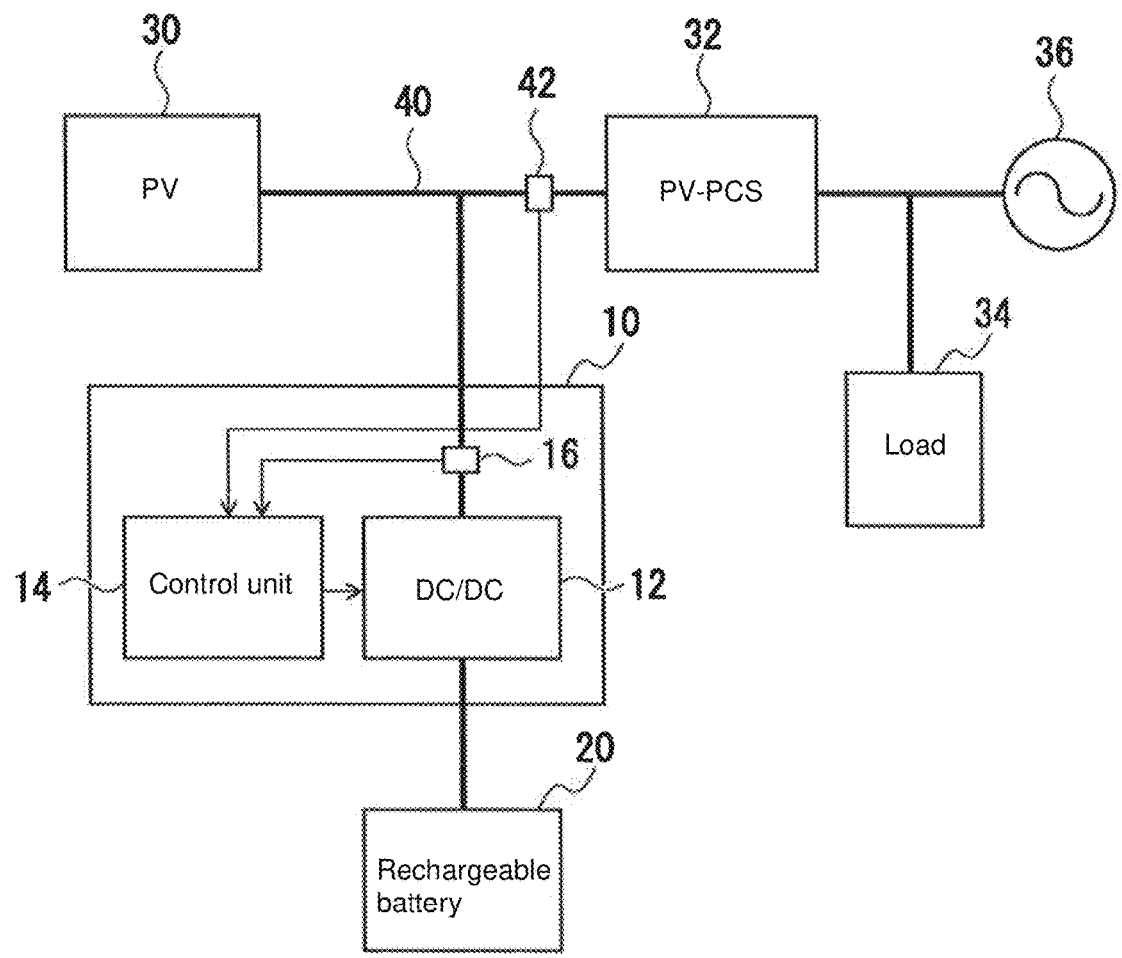
FIG. 1 is a schematic diagram of a power supply system including a rechargeable battery controller according to a first embodiment of the present invention.

The structure and the implementation of a rechargeable battery controller 10 according to a first embodiment of the present invention will first be described with reference to FIG. 1. FIG. 1 is a schematic diagram of a power supply system including the rechargeable battery controller 10.

The rechargeable battery controller 10 according to the present embodiment is to be incorporated, together with a rechargeable battery 20, into an existing photovoltaic (PV) system, which includes a power conditioner 32 and a PV module 30 connected to each other with a direct current (DC) line 40. The power conditioner 32 is connected to a load 34 and a grid 36. As shown in the figure, the rechargeable battery controller 10 mainly includes a DC-DC converter 12 and a control unit 14.

The DC-DC converter 12 is controlled by the control unit 14 and performs voltage conversion for charging the rechargeable battery 20 with power fed from the DC line 40 (or from the photovoltaic module 30) or outputting power stored in the rechargeable battery 20 to the DC line 40.

The control unit 14 controls the DC-DC converter 12 to regulate the charge/discharge power of the rechargeable battery 20 (power charging the rechargeable battery 20 and power discharged from the rechargeable battery 20) to an intended value (described in detail later). The control unit 14 includes a central processing unit (CPU), a read-only memory (ROM) storing, for example, programs (or firmware) to be executed by the CPU, a random access memory (RAM) used as a work area, and an interface circuit for each unit.

As shown in the figure, the control unit 14 receives a signal from a voltage sensor 16, which measures the voltage of the DC line 40, and a signal from a current sensor 42, which measures an input current in the power conditioner 32. The control unit 14 is electrically connected to an operation panel (not shown), which is used for various settings.

The functions of the rechargeable battery controller 10 will now be described.

Figure 2:
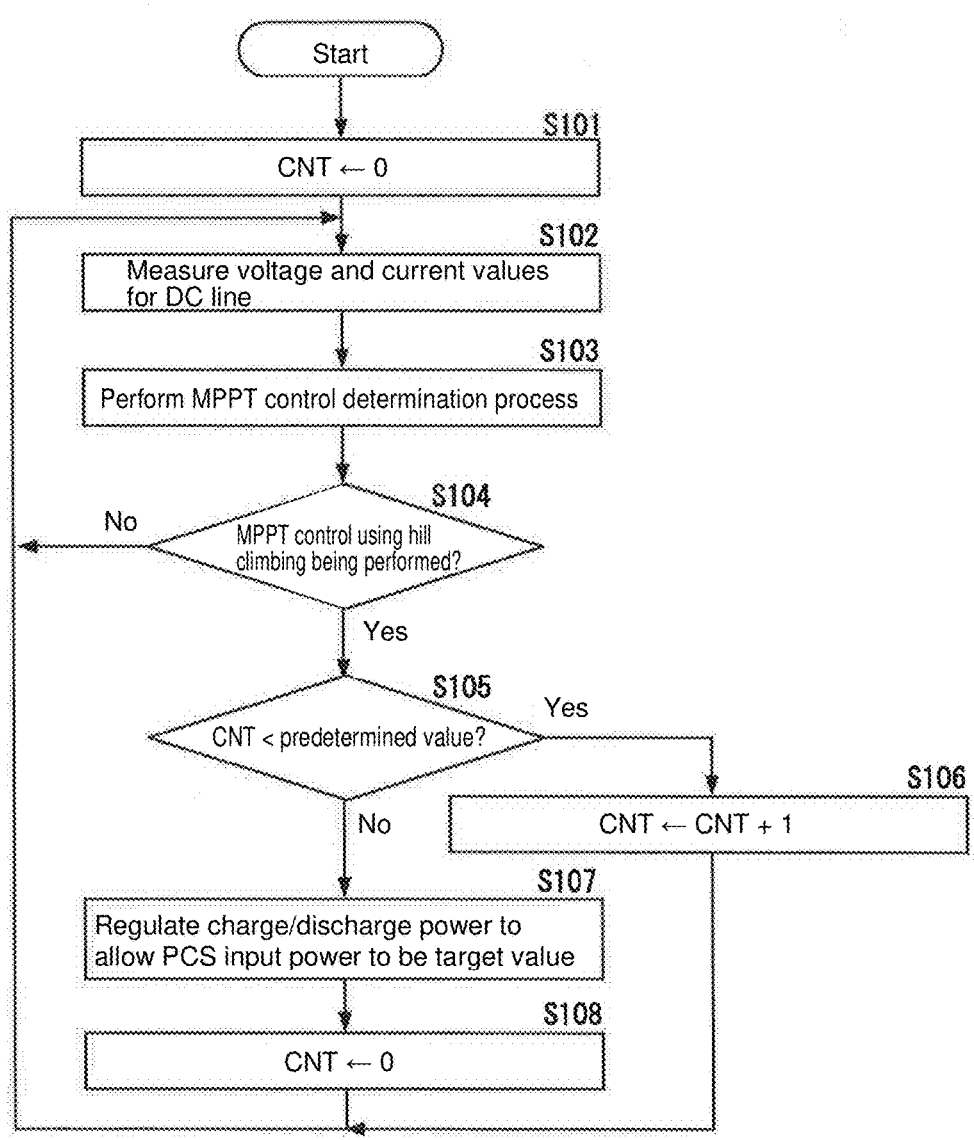
FIG. 2 is a flowchart showing a rechargeable battery control process performed by a control unit included in the rechargeable battery controller according to the first embodiment.

The control unit 14 in the rechargeable battery controller 10 is designed (or programmed) to start a rechargeable battery control process shown in FIG. 2 when the rechargeable battery controller 10 is powered on.

More specifically, the control unit 14, which has started the rechargeable battery control process when the rechargeable battery controller 10 is powered on, first sets a variable CNT to 0 (step S101).

The control unit 14 then performs a loop process from steps S102 to S108 in cycles $\Delta t_{SAM}$. The cycle $\Delta t_{SAM}$ is a predetermined value (time period) that is sufficiently shorter than the cycle in which the output voltage of the photovoltaic module 30 varies under MPPT control using common hill climbing to allow the type and the details of MPPT control currently being performed by the power conditioner 32 to be determined using the voltage value or other values for the DC line 40 measured in such cycles).

As shown in the figure, the control unit 14, which has started the loop process in steps S102 to S108, first measures the voltage value and the current value for the DC line 40 (step S102), or specifically obtains these values from the voltage sensor 16 and the current sensor 42.

The control unit 14 then performs an MPPT control determination process (step S103) for determining whether the power conditioner 32 is currently performing MPPT control using hill climbing.

The MPPT control determination process is performed by the control unit 14 to determine whether the voltage value for the DC line 40 varies stepwise based on the measurement history (or the past and current measurement results) of the voltage value for the DC line 40. The MPPT control determination process determines whether MPPT control using hill climbing is currently being performed. The voltage value for the DC line 40 varying stepwise equates to almost the same voltage value being continuously detected and then the voltage value different from the previous voltage value being continuously detected.

Figure 3:
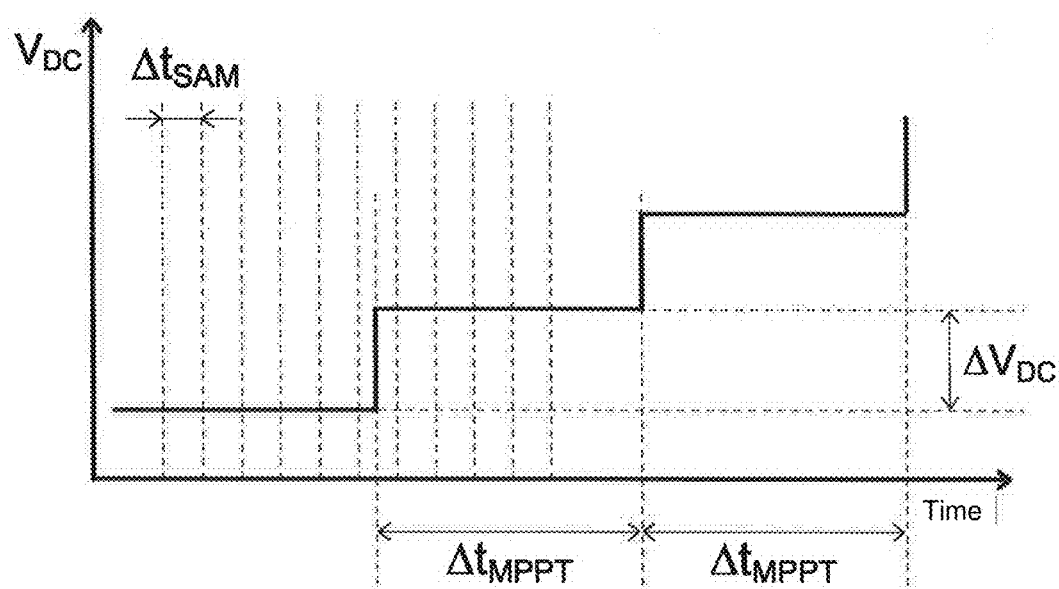
FIG. 3 is a diagram describing a time-variable pattern of a voltage value $V_{DC}$ for a DC line under MPPT control using hill climbing.

More specifically, when MPPT control using hill climbing is currently being performed by the power conditioner 32, the voltage value $V_{DC}$ for the DC line 40 periodically varies stepwise as shown in FIG. 3. In contrast, when MPPT control using hill climbing is stopped and other control is currently being performed, the voltage variation for the DC line 40 may be greater than the voltage variation $\Delta V_{DC}$ obtained for a single cycle of MPPT control using hill climbing, or the voltage value for the DC line 40 increases or decreases monotonically. Thus, the measurement history of the voltage value for the DC line 40 can be used to determine whether MPPT control using hill climbing is currently being performed.

When determining that MPPT control using hill climbing is currently being performed (Yes in step S104), the control unit 14 determines whether the CNT value is less than a predetermined value (step S105).

When the CNT value is less than the predetermined value (Yes in S105), the control unit 14 increments the CNT value by 1 (step S106), and then restarts the processing in step S102 and subsequent steps. When the CNT value reaches or exceeds the predetermined value (No in step S105) while MPPT control using hill climbing is being performed (Yes in step S104), the control unit 14 regulates the charge/discharge power of the rechargeable battery 20 (power charging the rechargeable battery 20 and power discharged from the rechargeable battery 20) (step S107) to allow the input power of the power conditioner 32 (PCS input power in FIG. 2) to be a target value.

More specifically, the input power of the power conditioner 32 decreases when the power from the photovoltaic module 30 is partially used for charging the rechargeable battery 20, and increases when the power stored in the rechargeable battery 20 is discharged onto the DC line 40. In step S107, the input power of the power conditioner 32 is calculated from the voltage value and the current value measured in step S102. The DC-DC converter 12 is controlled to regulate the charge/discharge power of the rechargeable battery 20 to allow the input power of the power conditioner 32 to be the target value.

An appropriate target value differs depending on the capacity of the rechargeable battery 20 or depending on the maximum power generated by the photovoltaic module 30. Thus, the rechargeable battery controller 10 according to the present embodiment allows the target value to be set either constant over time (points of time) or variable over time by operating the operation panel.

The charge/discharge power is regulated only when the CNT value is greater than or equal to the predetermined value. This is because the input power of the power conditioner 32 can be controlled to a value near the target value without the charge/discharge power of the rechargeable battery 20 being regulated in cycles similar to the cycles in which the voltage and other values are measured, although determining whether MPPT control using hill climbing is currently being performed uses the voltage and other values measured in relatively short cycles. To narrow the varying range of the input power of the power conditioner 32, the charge/discharge power of the rechargeable battery 20 may be regulated in cycles shorter than the cycles in which the output voltage of the photovoltaic module 30 are changed under MPPT control. When determining that the power conditioner 32 is currently performing MPPT control using hill climbing in the MPPT control determination process, the control unit 14 according to the present embodiment obtains the cycle $\Delta t_{MPPT}$ in which the output voltage of the photovoltaic module 30 varies under the MPPT control. When the predetermined value·$\Delta t_{SAM} > \Delta t_{MPPT}$, the control unit 14 changes the predetermined value to satisfy the predetermined value·$\Delta t_{SAM} \leq \Delta t_{MPPT}$.

The control unit 14 repeats the above processing in steps S105 to S108 while MPPT control using hill climbing is being performed, or specifically repeats regulating or changing the charge/discharge power to allow the input power of the power conditioner 32 to be the target value.

When determining that MPPT control using hill climbing is not currently being performed (No in step S104), the control unit 14 performs the processing in step S102 and subsequent steps, without performing the processing in steps S105 to S108. More specifically, while the power conditioner 32 is not performing MPPT control using hill climbing, the control unit 14 maintains the charge/discharge power of the rechargeable battery 20 to be the power at the beginning of the period.

When MPPT control using hill climbing is restarted (Yes in step S104), the control unit 14 is ready to advance to steps S105 to S108.

As described above, while MPPT control using hill climbing is being performed, the control unit 14 in the rechargeable battery controller 10 according to the present embodiment regulates the charge/discharge power of the rechargeable battery 20 to allow the input power of the power conditioner 32 to be the target value based on the input voltage value and the input current value of the input of the power conditioner 32. While MPPT control using hill climbing is not being performed, the control unit 14 maintains the charge/discharge power of the rechargeable battery 20 to be the power at the beginning of the period.

Whereas changing the charge/discharge power of the rechargeable battery under MPPT control using a method other than hill climbing can possibly shift the operating point to reduce power, changing the charge/discharge power of the rechargeable battery 20 under MPPT control using hill climbing will not greatly affect MPPT control. The rechargeable battery controller 10 according to the first embodiment can thus control the input power of the power conditioner in an existing PV system to a value near the target value without affecting MPPT control.

Second Embodiment

A rechargeable battery controller 10 according to a second embodiment of the present invention will now be described using the same reference numerals as used for the rechargeable battery controller 10 according to the first embodiment.

Figure 4:
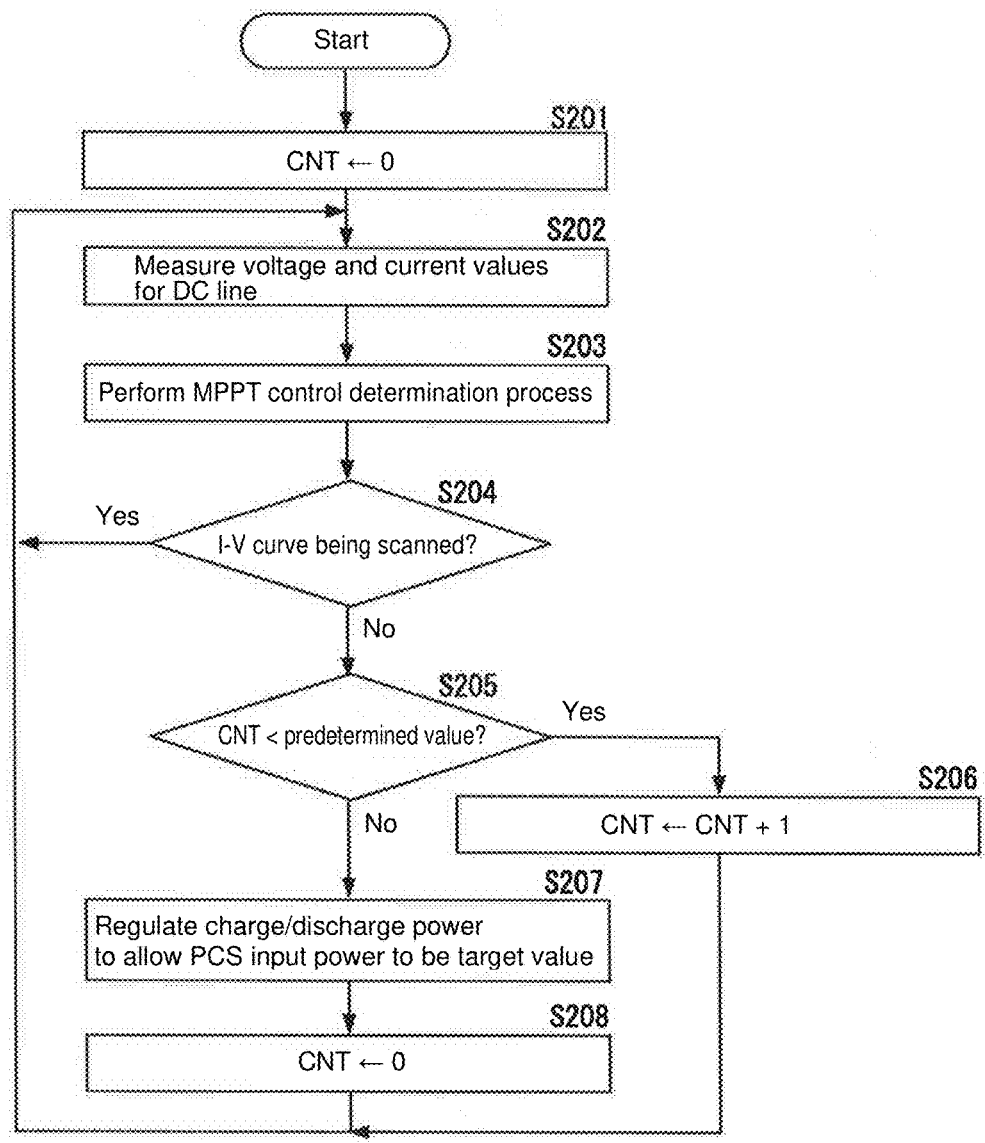
FIG. 4 is a flowchart showing a rechargeable battery control process performed by a control unit included in a rechargeable battery controller according to a second embodiment of the present invention.

The rechargeable battery controller 10 according to the present embodiment (hereafter referred to as the second rechargeable battery controller 10) is a modification of the rechargeable battery controller 10 according to the first embodiment (hereafter referred to as the first rechargeable battery controller 10) to perform a rechargeable battery control process shown in FIG. 4.

The processing in steps S201, S202, and S205 to S208 in this rechargeable battery control process is identical to the processing in steps S101, S102, and S105 to S108 in the rechargeable battery control process shown in FIG. 2 performed by the first rechargeable battery controller 10.

In the same manner as the MPPT control determination process performed in step S103, the MPPT control determination process in step S203 determines the type (item and its details) of MPPT control currently being performed by the power conditioner 32. More specifically, the MPPT control determination process in step S203 determines whether the I-V curve for the photovoltaic module 30 is currently being scanned based on a time-variable pattern of input current values of the power conditioner 32.

As shown in the figure, the rechargeable battery control process, which is performed by the second rechargeable battery controller 10, regulates the charge/discharge power of the rechargeable battery 20 to allow the input power of the power conditioner 32 to be the target value while the I-V curve for the photovoltaic module 30 is not being scanned (No in step S204). While the I-V curve for the photovoltaic module 30 is being scanned (Yes in step S204), the charge/discharge power of the rechargeable battery 20 is maintained to be the power at the beginning of the period.

The MPPT control using scanning (refer to Patent Literature 2), in which the I-V curve for the photovoltaic module is scanned in a short time, is the MPPT control process that is most susceptible to a change in the charge/discharge power of the rechargeable battery 20. Thus, the rechargeable battery controller 10 according to the second embodiment can control the input power of the power conditioner 5 included in an existing PV system to a value near the target value without affecting MPPT control.

Modifications

The rechargeable battery controllers 10 according to the first and second embodiments may be modified variously. For example, although the rechargeable battery controller 10 according to the first embodiment uses the time-variable pattern of $V_{DC}$ to determine whether MPPT control using hill climbing is currently being performed, the rechargeable battery controller 10 may use other information, such as a time-variable pattern of the input current of the power conditioner 32 and a time-variable pattern of the input current and the input voltage of the power conditioner 32, to determine whether MPPT control using hill climbing is currently being performed. Similarly, the rechargeable battery controller 10 according to the second embodiment may use the time-variable pattern of the input voltage of the power conditioner 32 or the time-variable pattern of the input current and the input voltage of the power conditioner 32 to determine whether the I-V curve for the photovoltaic module 30 is currently being scanned.

The rechargeable battery controller 10 according to each of the above embodiments may be modified to regulate the charge/discharge power of the rechargeable battery 20 in fixed cycles, or to start the rechargeable battery control process under conditions different from those described above (e.g., to start the rechargeable battery control process when the generated power reaches or exceeds a predetermined value).

REFERENCE SIGNS LIST 10 rechargeable battery controller
12 DC-DC converter
14 control unit
16 voltage sensor
20 rechargeable battery
30 photovoltaic module
32 power conditioner
34 load
36 grid
40 DC line
42 current sensor

The invention claimed is:

1. A rechargeable battery controller connectable to a rechargeable battery and a power line, the power line connecting a photovoltaic module and a power conditioner, the power conditioner configured to perform maximum power point tracking control using hill climbing, the rechargeable battery controller comprising:
a DC-DC converter that passes charge/discharge power between the power line and the rechargeable battery; and
a control unit comprising a processor configured with a program to perform operations comprising:
controlling the DC-DC converter to regulate the charge/discharge power passed between the power line and the rechargeable battery through the DC-DC converter, and
determining whether the maximum power point tracking control using the hill climbing is being performed by the power conditioner based on: an input voltage value of the power conditioner; or an input current value of the power conditioner;
in response to determining that the maximum power point tracking using the hill climbing is being performed, controlling the DC-DC converter to regulate the charge/discharge power passed between the power line and the rechargeable battery through the DC-DC converter such that, an input power value of the power conditioner is a target value based on the input voltage value and the input current value; and
in response to determining that the maximum power point tracking control using the hill climbing is not being performed, controlling the DC-DC converter to maintain the charge/discharge power to a charge/discharge power occurring at a beginning of a period during which the maximum power point tracking control using the hill climbing is not performed.

2. The rechargeable battery controller according to claim 1, wherein
the period during which the maximum power point tracking control using the hill climbing is not performed comprises a period during which an I-V curve for the photovoltaic module is scanned by the power conditioner.

3. The rechargeable battery controller according to claim 2, wherein
the control unit is configured with the program to perform operations further comprising:
obtaining a cycle in which an output voltage of the photovoltaic module varies under maximum power point tracking control using hill climbing performed by the power conditioner; and
changing a cycle for regulating the charge/discharge power while maximum power point tracking control using hill climbing is performed to a cycle shorter than or equal to the obtained cycle.

4. The rechargeable battery controller according to claim 1, wherein
the control unit is configured with the program to perform operations further comprising:
obtaining a cycle in which an output voltage of the photovoltaic module varies under the maximum power point tracking control using the hill climbing performed by the power conditioner; and
changing a cycle for regulating the charge/discharge power while the maximum power point tracking control using the hill climbing is performed to a cycle shorter than or equal to the obtained cycle.

5. A rechargeable battery controller connectable to a rechargeable battery and a power line, the power line connecting a photovoltaic module and a power conditioner configured to perform maximum power point tracking control by scanning an I-V curve for the photovoltaic module, the rechargeable battery controller comprising:
a DC-DC converter that passes charge/discharge power between the power line and the rechargeable battery; and
a control unit comprising a processor configured with a program to perform operations comprising:
controlling the DC-DC converter to regulate the charge/discharge power passed between the power line and the rechargeable battery through the DC-DC converter;
determining whether the I-V curve for the photovoltaic module is being scanned by the power conditioner based on: an input voltage value of the power conditioner; or an input current value of the power conditioner;

in response to determining that the I-V curve of the photovoltaic module is not being scanned, controlling the DC-DC converter to regulate the charge/discharge power passed between the power line and the rechargeable battery through the DC-DC converter such that, an input power value of the power conditioner is a target value based on the input voltage value and the input current value; and in response to the I-V curve for the photovoltaic module being scanned, controlling the DC-DC converter to maintain the charge/discharge power to a charge/discharge power at a beginning of a period during which the I-V curve for the photovoltaic module is being scanned.

6. The rechargeable battery controller according to claim 5, wherein the control unit is configured with the program to perform operations further comprising:

obtaining a cycle in which an output voltage of the photovoltaic module varies under maximum power point tracking control by scanning the I-V curve for the photovoltaic module performed by the power conditioner; and changing a cycle for regulating the charge/discharge power while maximum power point tracking control by scanning the I-V curve for the photovoltaic module is performed to a cycle shorter than or equal to the obtained cycle.

* * * * *